Dec. 3, 1935.  W. I. BULLARD  2,023,379
TEXTILE REENFORCED ARTICLES AND METHOD OF MAKING SAME
Filed Sept. 7, 1933  2 Sheets-Sheet 1
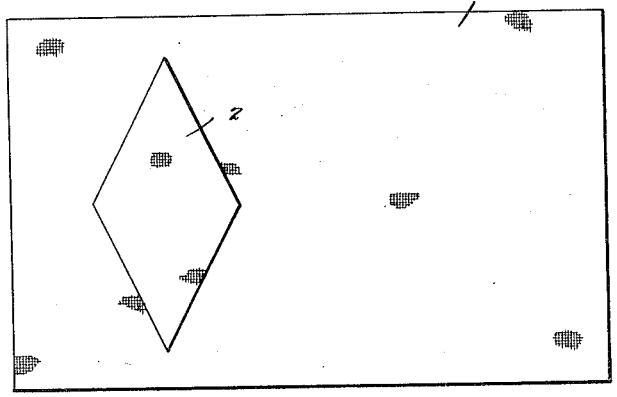
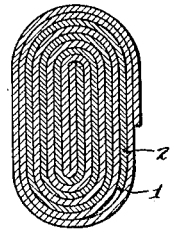
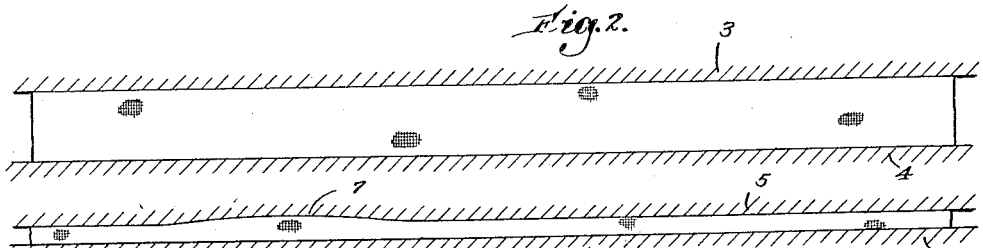
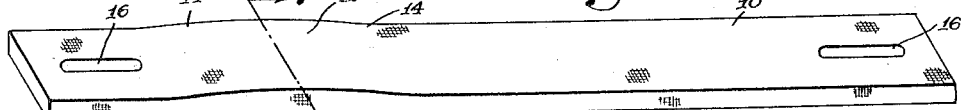
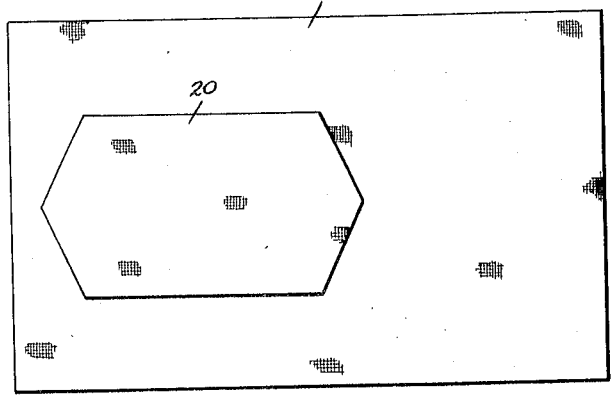
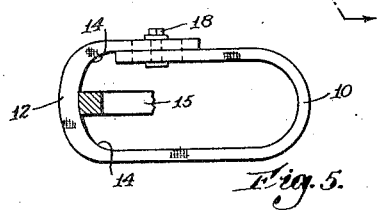
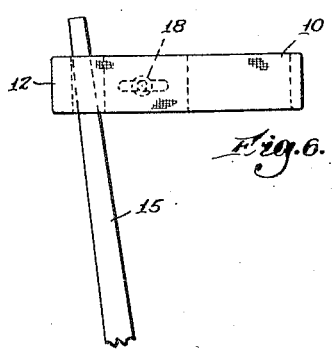
Inventor
Washington Irving Bullard
by James R. Hodder
attorney Dec. 3, 1935. W. I. BULLARD 2,023,379
TEXTILE REENFORCED ARTICLES AND METHOD OF MAKING SAME
Filed Sept. 7, 1933 2 Sheets-Sheet 2
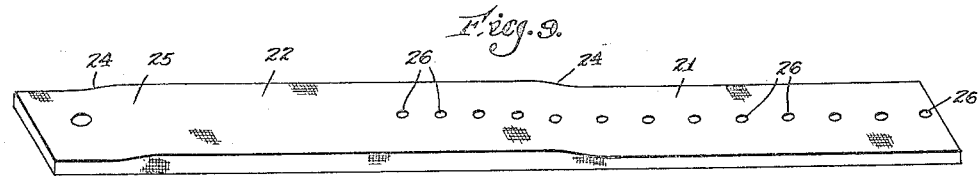
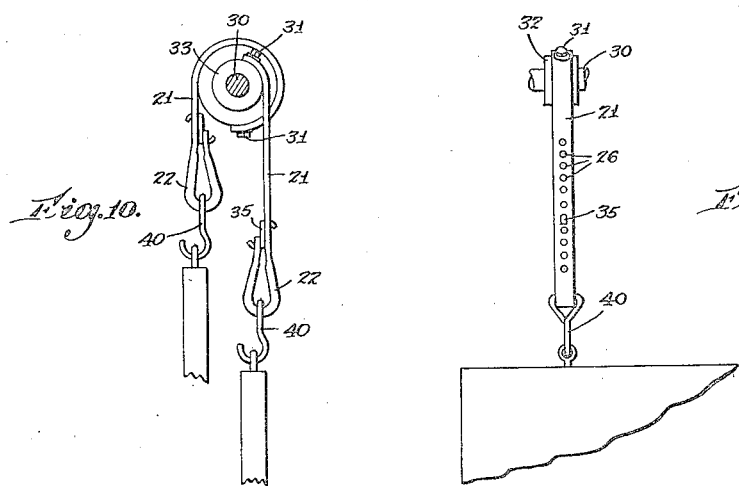
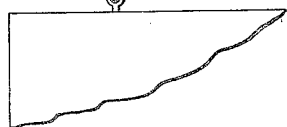
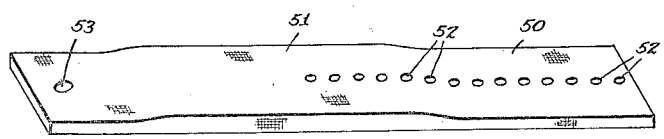
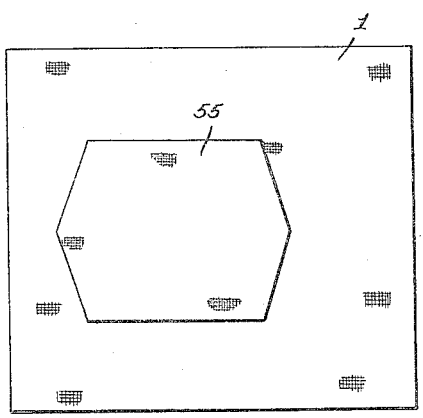

Patented Dec. 3, 1935

2,023,379

UNITED STATES PATENT OFFICE 2,023,379

TEXTILE REENFORCED ARTICLES, AND METHOD OF MAKING SAME

Washington Irving Bullard, Danielson, Conn., assignor to E. H. Jacobs Manufacturing Company, Danielson, Conn.

Application September 7, 1933, Serial No. 688,494

1 Claim. (Cl. 139—161)

My present invention is a novel and improved method of making textile articles with predetermined reenforcements or portions and resulting in an improved article of manufacture.

In various devices, such for example, as are used in textile machinery, lug straps, harness straps, check straps, jack straps, and the like, an undue strain is liable to come upon a special portion and hence wear out the same quickly at such part. Heretofore, it has been extremely difficult to provide any suitable and satisfactory means for strengthening such portions where undue wear occurs. Thus, for example, in a harness strap where the same is adapted to be bent or flexed over a pulley, if the entire strap was made too thick and rigid, it is objectionable; and if made light enough to bend and flex readily and with uniformity, it is likely to wear through quickly at certain points of extra stress or strain. As such points of undue wear are variable and adjustable, an extremely difficult problem is presented. Metal and leather straps have been used but these were not satisfactory.

My present invention enables a predetermined reenforcing portion to be produced in harness straps, for example, which would not interfere with its uniform flexiblity and use and yet would strengthen the same throughout the point of greatest wear.

A similar situation is present in the case of check straps used in combination with picker sticks. These check straps must be capable of quick application and renewal, and receive and check the blows of the picker stick. By my invention I am enabled to reenforce a check strap built of textile layers in the particular manner which will greatly increase the wearing life of the check strap without decreasing its efficiency and resiliency.

A similar condition is found in jack straps for looms, and I have discovered, by my present invention, a method of making textile straps of this character which will be of substantially uniform strength throughout while reinforced at the particular portion necessary to withstand the greatest wear, thus insuring long life to the strap and preventing its being discarded when only one part has been subject to wear and strain.

Furthermore, I have discovered by the method of reenforcing textile layers which I disclose herewith, the expense of making such straps, with their reenforcements contained therein, is not increased, nor are the methods of manufacture now in general use for same varied, changed, or altered to any serious extent.

Furthermore, my invention contemplates the manufacture of such reenforced predetermined portions in a manner which will automatically effect a smooth, inclined, or beveled outer face between the reinforced section and the remainder of the article of normal dimensions.

Further improvements, advantages, and novel features will be hereinafter more fully pointed out and claimed.

Referring to the drawings,

Fig. 1 is a plan view illustrating the first step in the process of making my improved textile reenforced article;

Figs. 2 and 3 are successive steps showing the compressing process;

Fig. 4 illustrates the completed article from which a check strap is made;

Fig. 5 illustrates the check strap in use;

Fig. 6 is a side view corresponding to Fig. 5 shown at right angles;

Fig. 7 is an enlarged cross-sectional view on the line 7—7 of Fig. 4 before compression;

Fig. 8 is a plan view of the first process in manufacturing a reenforced harness strap according to my invention;

Fig. 9 is a perspective view of the reenforced harness;

Figs. 10 and 11 are side and end views respectively showing the reenforced harness strap as employed in use;

Fig. 12 is a view of the reenforced jack strap, and

Fig. 13 illustrates the first step in the process of making same.

As shown in the drawings, I provide a suitable sheet or layer of textile material 1 of appropriate dimensions for the width, length, and thickness of the resultant article to be made therefrom, such as herein shown, for example, to be utilized as a check strap.

I then provide a reenforcing layer so cut, proportioned, and positioned on the layer 1 as to afford the reenforcement desired, with the smoothly tapering approach to the reenforced section when the completed articles are interrolled. For the purpose of a check strap where a short reenforcement only is desired, I prefer to form this reinforcement 2 as shown in Fig. 2 of diamond-like shape, positioning the same crosswise of the base sheet 1, thereupon interrolling the same in the usual manner, the layers being coated with suitable adhesive to effect a binding or solidfying action when subjected to the subsequent pressing dies, molds, or forms 3 and 4 on one side, and 5 and 6 on the other. It will be noted that the dies, molds, or forms 5 and 6 are provided on one of their pressing surfaces with a suitable enlargement 7 preferably proportioned for the added thickness afforded by the reenforcing layer 2 as interrolled in the strap.

These dies, molds, or forms complete the forming and solidifying of the reenforced strap 10 with the reenforced section 12 in desired position, as shown, to receive the extra thrust and wear of a picker stick 15 during use. The check strap 10 is provided with bolt slots 16 and 17 at each end so that the strap may have its ends united by a bolt 18 to form the completed check strap, as shown in Figs. 5 and 6.

It will thus be seen that with my invention, I provide a novel reenforced textile interrolled strap with the reenforcement tapered as at 14—14, giving a greater thickness 12 where desired at a predetermined portion and facilitating turning or flexing of the entire strap from the flat form of Fig. 4 into the completed check strap form of Fig. 5.

Referring to Figs. 8 and 9, I have herein illustrated a harness strap and method of constructing the same, wherein the reenforcement is of substantially greater width and extent and intended to cover a particular portion where the retainer hooks are utilized. For this purpose I utilize the base material 1 in combination with a reenforcing layer 20 of different contour, size, and dimensions but with the tapered feature at each side of the reenforcement. This blank with the reenforcement 20 is coated with adhesive, interrolled, and compressed in the same manner as that above described in explaining the check strap 10, and resulting in the harness strap blank 21, with an interchanged reenforced area of considerable extent 22, having the tapered end portions 24—24.

This harness strap is of appropriate length and is provided at one end with bolt slots 25 or the like, and a plurality of recesses 26—26. My improved reenforced harness loom strap is thus adapted to be secured to a rock shaft 30 by attachment of a bolt 31 through a recess 26 into a hub 32 keyed on the rock shaft. At the opposite end through the slot 25 is attached the fastening 35, having an S-hook adapted with one end to engage the slot 25 and the opposite end to engage any one of the recesses 26 to which the harness may be adjusted. Thus my improved harness strap brings the reenforced area or section 22 where the harness hook 40 wears upon same irrespective of the length to which the strap may be adjusted, as will be readily appreciated.

In this particular form I am thus enabled to make my novel reenforced harness strap with the greatest thickness and reenforcement for a substantially predetermined length without interfering with the smoothness and flexibility of the action of the harness as it is drawn over and released from the rock shaft 30 during the raising and lowering of adjacent harnesses.

In Fig. 12 I have illustrated my invention as applied to a jack strap 50, having reenforcing sections 51 and a plurality of holes 52 for adjustment and an end strap hole 53 for attachment.

In Fig. 13 the method of making this type of reenforcement is illustrated wherein the base layer 1 has the reinforcing layer 55 applied substantially interrolled, secured, and compressed as above described.

Thus it will be seen that my novel method of manufacturing and producing a new and novel reenforced textile article first by appropriately cutting, positioning, applying and interrolling reenforcements of predetermined form and contour and thereafter compressing the same by dies, molds, or forms of appropriate contour to cooperate with the reenforced thickness, each giving a smooth tapering action from the reenforced section or portion to the rest of the strap, is of considerable importance in this art. I am enabled to produce a longer wearing textile strap with the wear-resisting portion exactly where desired, and, in the case of such straps going over pulleys, will enable the flexing to function fully and perfectly and even running into and over the reenforced part because of the tapering feature.

As far as I am advised, this is a distinct novelty in this art and I wish to claim the completed article and method of making same broadly herein.

While ordinarily a single base layer 1 may be utilized, I can of course employ a plurality of such layers, if desired, and while usually the reenforcement is a single sheet, such as 2, 20, or 55 this may be double or multiple. The interrolling with the adhesive and the subsequent compressing, solidifies the entire article and further serves to smooth and taper the section between the reenforced portion and the normal strap portion.

I claim:

An improved loom check strap adapted to be formed into a circular shape with a reenforced and thickened portion for wear-resisting contact with a loom picker stick, comprising an interrolled textile fabric united by adhesive enclosing a reenforcing layer with a pointed triangular section, having a point arranged centrally of the reinforced portion of the check strap and tapering uniformly therefrom, whereby a predetermined reenforced wear-resisting part of greater thickness has its reenforcement enclosed between the inner and outer faces of the lug strap, said faces being in substantially smooth parallel arcs throughout the extent of the picker contacting portion when the strap is in its circular form.

WASHINGTON IRVING BULLARD.